United States Patent [19]
Johnson

[11] Patent Number: 5,336,854
[45] Date of Patent: Aug. 9, 1994

[54] ELECTRONIC FORCE SENSING LOAD CELL

[75] Inventor: Thomas H. Johnson, Winnebago, Minn.

[73] Assignee: Weigh-Tronix, Inc., Fairmont, Minn.

[21] Appl. No.: 862,827

[22] Filed: Apr. 3, 1992

[51] Int. Cl.$^5$ .................. G01G 3/14; G01G 3/08; G01B 7/16; G01L 1/22
[52] U.S. Cl. .................. 177/210 FP; 177/229; 338/6; 73/862.627
[58] Field of Search .................. 177/211, 229, 210 FP; 338/6; 73/862.627

[56] References Cited

U.S. PATENT DOCUMENTS

| | | |
|---|---|---|
| D. 256,342 | 8/1980 | Gard . |
| D. 256,343 | 8/1980 | Gard . |
| D. 275,558 | 9/1984 | Pearson . |
| 3,140,450 | 7/1964 | Tavis . |
| 3,161,046 | 8/1964 | Farley . |
| 3,238,789 | 3/1966 | Erdley . |
| 3,269,192 | 8/1966 | Southworth, Jr. et al. . |
| 3,274,828 | 9/1966 | Pulvari . |
| 3,332,506 | 7/1967 | Bradfield . |
| 3,366,191 | 1/1968 | Reid et al. . |
| 3,399,572 | 9/1968 | Riordan et al. . |
| 3,404,744 | 10/1968 | Williams . |
| 3,413,859 | 12/1968 | Riordan . |
| 3,434,090 | 3/1969 | Chelner . |
| 3,440,888 | 4/1969 | Southworth, Jr. et al. . |
| 3,465,597 | 9/1969 | Riordan et al. . |
| 3,470,400 | 9/1969 | Weisbord . |
| 3,479,536 | 11/1969 | Norris . |
| 3,486,383 | 12/1969 | Riordan . |
| 3,505,866 | 4/1970 | Weisbord et al. . |
| 3,513,356 | 5/1970 | Newell . |
| 3,529,470 | 9/1970 | Agar . |
| 3,541,849 | 11/1970 | Corbett . |
| 3,552,511 | 1/1971 | Marcheso et al. . |
| 3,557,891 | 1/1971 | Klopfenstein . |
| 3,604,525 | 9/1971 | Blethen et al. . |
| 3,621,713 | 11/1971 | Wirth et al. . |
| 3,684,875 | 8/1972 | Smith et al. . |
| 3,685,604 | 8/1972 | Smith et al. . |
| 3,712,395 | 1/1973 | Streater et al. . |
| 3,716,706 | 2/1973 | Gray . |
| 3,724,572 | 4/1973 | Saner . |
| 3,742,418 | 6/1973 | Randolph, Jr. . |
| 3,786,884 | 1/1974 | Allenspach . |
| 3,788,410 | 1/1974 | Allenspach et al. . |
| 3,789,937 | 2/1974 | Strobel et al. . |
| 3,826,931 | 7/1974 | Hammond . |
| 3,863,497 | 2/1975 | Van de Vaart et al. ............ 73/71.2 |
| 3,869,004 | 3/1975 | Gallo . |

(List continued on next page.)

FOREIGN PATENT DOCUMENTS 0016238  3/1979  European Pat. Off. .

(List continued on next page.)

OTHER PUBLICATIONS

Weigh-Tronix, Model 8230 Counting Scale Spec Sheet (1991).

(List continued on next page.)

Primary Examiner—George H. Miller, Jr.
Attorney, Agent, or Firm—Merchant, Gould, Smith, Edell, Welter & Schmidt

[57] ABSTRACT

A load cell device includes a load cell structure formed of a suitable metal and including vertically spaced apart, generally parallel horizontal elements integrally formed with longitudinally spaced apart, generally parallel vertical elements. Flexures interconnect each horizontal element with the vertical elements. A bending beam extends between and is interconnected with the horizontal or vertical elements. When a load is applied vertically and perpendicularly to one of the horizontal elements, the load cell structure will elastically deform as a parallelogram to thereby transfer shear force to the bending beam to cause shear-induced bending of the latter. Strain gages or frequency resonator crystal elements sense the shear-induced bending and are embodied in electronic circuitry which produces an output signal caused by deformation of the bending beam. The electronic circuitry is operable to convert the output signal to a perceptive force readout.

1 Claim, 7 Drawing Sheets

U.S. PATENT DOCUMENTS

| | | | |
|---|---|---|---|
| 3,885,427 | 5/1975 | Melcher et al. . | |
| 3,897,681 | 8/1975 | Meier . | |
| 3,902,374 | 9/1975 | Hoffman et al. . | |
| 3,915,248 | 10/1975 | Paelian . | |
| 3,951,221 | 4/1976 | Rock . | |
| 3,963,082 | 6/1976 | Meier . | |
| 3,969,640 | 7/1976 | Staudte . | |
| 3,991,840 | 11/1976 | Rawcliffe . | |
| 3,998,104 | 12/1976 | Albert . | |
| 4,009,608 | 3/1977 | Ormond | 73/141 A |
| 4,014,397 | 3/1977 | Langevin . | |
| 4,026,158 | 5/1977 | Albert . | |
| 4,039,969 | 8/1977 | Martin . | |
| 4,041,289 | 8/1977 | Brosh et al. . | |
| 4,043,190 | 8/1977 | Gallo . | |
| 4,064,744 | 12/1977 | Kistler . | |
| 4,075,887 | 2/1978 | Gallo . | |
| 4,088,014 | 5/1978 | Wirth et al. . | |
| 4,089,058 | 5/1978 | Murdock . | |
| 4,089,217 | 5/1978 | Rahav et al. . | |
| 4,104,920 | 8/1978 | Albert et al. . | |
| 4,107,985 | 8/1978 | Sommer | 73/141 |
| 4,109,534 | 8/1978 | Albert . | |
| 4,139,070 | 2/1979 | Hanson et al. . | |
| 4,143,727 | 3/1979 | Jacobson | 177/211 |
| 4,144,747 | 3/1979 | Datwyler, Jr. . | |
| 4,167,686 | 9/1979 | Fukuyo . | |
| 4,170,270 | 10/1979 | Sette et al. . | |
| 4,179,004 | 12/1979 | Ebbinge | 177/211 |
| 4,196,784 | 4/1980 | Suzuki et al. | 177/211 |
| 4,215,570 | 8/1980 | EerNisse . | |
| 4,219,089 | 8/1980 | Gard et al. . | |
| 4,221,131 | 9/1980 | Albert . | |
| 4,237,988 | 12/1980 | Blawert et al. . | |
| 4,239,088 | 12/1980 | Check et al. . | |
| 4,262,193 | 4/1981 | Ozawa . | |
| 4,297,872 | 11/1981 | Ikeda et al. . | |
| 4,299,122 | 11/1981 | Ueda et al. . | |
| 4,300,648 | 11/1981 | Gallo et al. . | |
| 4,321,500 | 3/1982 | Paros et al. | 310/321 |
| 4,350,918 | 9/1982 | Sato . | |
| 4,362,961 | 12/1982 | Gerber . | |
| 4,372,173 | 2/1983 | EerNisse et al. . | |
| 4,375,243 | 3/1983 | Doll . | |
| 4,377,765 | 3/1983 | Kogure et al. . | |
| 4,384,495 | 5/1983 | Paros . | |
| 4,386,535 | 6/1983 | Albert . | |
| 4,406,966 | 9/1983 | Paros . | |
| 4,415,827 | 11/1983 | Chuang . | |
| 4,429,248 | 1/1984 | Chuang . | |
| 4,430,894 | 2/1984 | Albert et al. . | |
| 4,435,666 | 3/1984 | Fukui et al. . | |
| 4,445,065 | 4/1984 | Albert . | |
| 4,446,394 | 5/1984 | Albert | 310/321 |
| 4,447,853 | 5/1984 | Tomuro et al. . | |
| 4,448,546 | 5/1984 | Paros . | |
| 4,454,770 | 6/1984 | Kistler . | |
| 4,459,042 | 7/1984 | Paros . | |
| 4,467,651 | 8/1984 | Peters et al. . | |
| 4,469,979 | 9/1984 | Chuang . | |
| 4,479,385 | 10/1984 | Koehler . | |
| 4,479,391 | 10/1984 | Banik et al. . | |
| 4,493,384 | 1/1985 | Yano et al. . | |
| 4,497,386 | 2/1985 | Meier . | |
| 4,526,247 | 7/1985 | Eer Nisse et al. | 177/210 |
| 4,535,638 | 8/1985 | EerNisse et al. . | |
| 4,538,461 | 9/1985 | Juptner et al. . | |
| 4,544,858 | 10/1985 | Nishiguchi et al. . | |
| 4,558,756 | 12/1985 | Seed | 177/211 |
| 4,587,853 | 5/1986 | Komoto et al. . | |
| 4,592,663 | 6/1986 | EerNisse et al. . | |
| 4,623,813 | 11/1986 | Naito et al. | 310/313 |
| 4,629,016 | 12/1986 | Knothe et al. . | |
| 4,656,383 | 4/1987 | Albert . | |
| 4,658,174 | 4/1987 | Albert . | |
| 4,658,175 | 4/1987 | Albert . | |
| 4,669,320 | 6/1987 | Simonsen . | |
| 4,685,525 | 8/1987 | Knothe et al. . | |
| 4,710,668 | 12/1987 | Fima et al. . | |
| 4,718,275 | 1/1988 | Norling . | |
| 4,724,351 | 2/1988 | EerNisse et al. . | |
| 4,727,752 | 3/1988 | Peters . | |
| 4,743,790 | 5/1988 | Albert | 310/321 |
| 4,750,363 | 6/1988 | Norling . | |
| 4,751,849 | 6/1988 | Paros et al. . | |
| 4,766,768 | 8/1988 | Norling et al. . | |
| 4,782,456 | 11/1988 | Poussier et al. . | |
| 4,785,215 | 11/1988 | Blech . | |
| 4,804,875 | 2/1989 | Albert . | |
| 4,810,922 | 3/1989 | Hirsch . | |
| 4,838,369 | 6/1989 | Albert | 177/210 |
| 4,872,343 | 10/1989 | Peters et al. . | |
| 4,879,914 | 11/1989 | Norling . | |

FOREIGN PATENT DOCUMENTS

| | | |
|---|---|---|
| 0096653 | 12/1983 | European Pat. Off. . |
| 0167055 | 1/1986 | European Pat. Off. . |
| 2335658 | 1/1975 | Fed. Rep. of Germany . |
| 3119806 | 12/1982 | Fed. Rep. of Germany . |
| 2660433 | 10/1991 | France . |
| 556621 | 3/1971 | Switzerland . |
| 559136 | 8/1977 | U.S.S.R. . |
| 1379670 | 3/1971 | United Kingdom . |
| 1322871 | 7/1973 | United Kingdom . |

OTHER PUBLICATIONS

Weigh-Tronix, Model 8250 Counting Scale Spec Sheet (1991).

Weigh-Tronix, Model PC-800 Counting Scale Spec Sheet (1992).

U.S. PATENT DOCUMENTS

| | | |
|---|---|---|
| 4,891,982 | 1/1990 | Norling . |
| 4,912,990 | 4/1990 | Norling . |
| 4,929,860 | 5/1990 | Hulsing, II et al. . |
| 4,970,903 | 11/1990 | Hanson . |
| 4,980,598 | 12/1990 | Albert . |
| 5,005,413 | 4/1991 | Novack et al. . |
| 5,036,715 | 8/1991 | Hanson . |
| 5,109,175 | 4/1992 | Albert . |
| 5,113,698 | 5/1992 | Grlj et al. . |

OTHER PUBLICATIONS

Micro Crystal Literature, "Quartz Force Transducer Double-Ended Tuning Fork", (Nov. 1986).

Measurements Group, Inc., Literature, "Tech Note TN-507, Wheatstone Bridge Nonlinearity, Errors Due to Wheatstone Bridge Nonlinearity", (1982).

W. C. Albert et al., "Vibrating Beam Accerelometer for Strapdown Applications", *IEEE 1982 Position Location and Navigation Symposium*, 319–322 (1982).

S. S. Chuang, "Force Sensor Using Double-Ended Tuning Fork Quartz Crystals", *Proceedings of the 37th Symposium on Frequency Control* 248:254 (1983).

W. C. Albert, "Forcing Sensing Using Quartz Crystal Flexture Resonators", *Porceedings on the 38th Annual Frequency Control Symposium* 233:239 (1984).

T. Ueda et al., *Measurement* 3(2):89–94 (1985).

W. J. Kass et al., "Double-Ended Tuning Fork Quartz Accerelometer", *Proceedings of the 40th Annual Frequency Control Symposium*, 230–236 (1986).

L. D. Clayton et al., *IEEE Transactions on Ultrasonics, Ferroelectrics, and Frequency Control* UFFC-34(2):243–252 (1987).

B. L. Norling, *Navigation: Journal of the Institute of Navigation* 34(4):337–353 (1987–1988).

W. C. Albert, "A. Low Cost Forcing Sensing Crystal Resonator Applied to Weighing", *Proceedings of the 42nd Annual Frequency Control Symposium* 78–84 (1988).

E. D. Reedy, Jr. et al., "Finite-Element Analysis of a Quartz Digital Accerelometer", *IEEE Transactions on Ultrasonics, Ferroelectrics, and Frequency Control*, 37(5):464–474 (1990).

E. P. EarNisse et al., *Sensors* 40–42 Aug. (1992).

Patent Abstracts of Japan, vol. 7, No. 184 (P-216)(1329) 13 Aug. 1983 & JP, A, 58 085 127 (Kiyouwa Dengiyou K. K.) 12 May 1983.

ELECTRONIC FORCE SENSING LOAD CELL

FIELD OF THE INVENTION

This invention relates to a force sensing load cell and, more particularly, to an electronic force sensing load cell, in which the bending induced strain to be measured induced by pure shear.

BACKGROUND OF THE INVENTION

It has long been known to measure elastic strain resulting from load-induced stresses of elements, such as beams, columns, diaphragms, and the like, through the use of electrical strain gages for the accurate translation of the exhibited strains into convenient related variations in electrical impedances. Wire, foil, and semi-conductor type gages find widespread application in such transducer devices and lend themselves well to manufacture in highly miniaturized form, suitable for installation upon small surface areas of such transducer devices.

Commonly, the transducers are designed and fabricated as self-contained devices intended to satisfy the needs of a variety of installations, but, in general, they tend to be accurately responsive only when the applied loading is carefully centered with respect to a predetermined axis. In small size transducer units, auxiliary diaphragms are often employed to suppress undesirable lateral deflections. In larger transducer assemblies, such as those embodied in massive weighing platforms or the like, potentially troublesome side forces may be resisted by strong, but somewhat elastic, structural members, which are sometimes referred to as flexures or stay rods. In these arrangements, flexible guide means are provided, which effectively parallel the load cells or transducers. In load cells of this particular design, the critical spring characteristics of the sensor are modified by those of the parallel flexure members or stay rods, and measurement accuracy and linearity can be seriously impaired by any erratic or non-linear behavior of these members. More recently, some load cells have used force-sensitive resonators to measure the frequency output as the function of the applied load.

However, these prior art load cells, as described hereinabove, are limited in resolution by anelastic creep and static strain hysteresis, which is apparent when low shear stresses, in relation to bending stresses, exist within flexing elements of the load cells. Further, in these prior art load cells, side forces and effects, other than the forces to be measured, must be offset by bridge-circuit balancing. Bridge-circuit balancing requires that the placement of the strain gages be exact and also requires that the gage factors of all of the gages be the same. It has been the general custom and practice to offset these inaccuracies by custom machining these prior art load cells.

SUMMARY OF THE INVENTION

It is a general object of this invention to provide a novel and improved electronic force sensing load cell, which develops output signals highly isolated from unwanted information and from disturbances attributable to variations in the location of loading forces.

Another object of this invention is to provide an electronic force sensing cell, which displays reduced anelastic creep and static strain hysteresis effects.

In carrying out this invention, the load cell is constructed to define symmetrically arranged horizontal and vertical rigid members, which are interconnected by flexures so that the load cell forms and functions as a parallelogram. In one embodiment of the invention, a vertical bending beam extends between and is rigidly connected to the horizontal parallelogram elements. Strain gages are applied to the bending beam so that, when one vertical parallelogram element is fixed and a load is applied perpendicularly to the other vertical element, the load cell will deform as a parallelogram in response to substantial shear. This shear induced deformation is transferred to the bending beam which will also elastically deform. The strain gages are included in a Wheatstone bridge circuit. When the bridge circuit is electrically excited, the output signal of the bridge circuit will measure the exhibited strains in the bending beam, produced by the load force as pure shear, regardless of the specific location of loading the load cell.

In another embodiment of the invention, the bending beam is horizontally disposed and extends between vertical elements of the load cell. In a further embodiment of the invention, offset vertical beam elements are connected to the horizontal elements of the load cell. Force sensitive resonator elements interconnect the offset beam elements, and the frequency output of the resonator elements is measured as a function of the applied load.

DESCRIPTION OF THE PREFERRED EMBODIMENTS

Figures 1, 2, 3, 4:
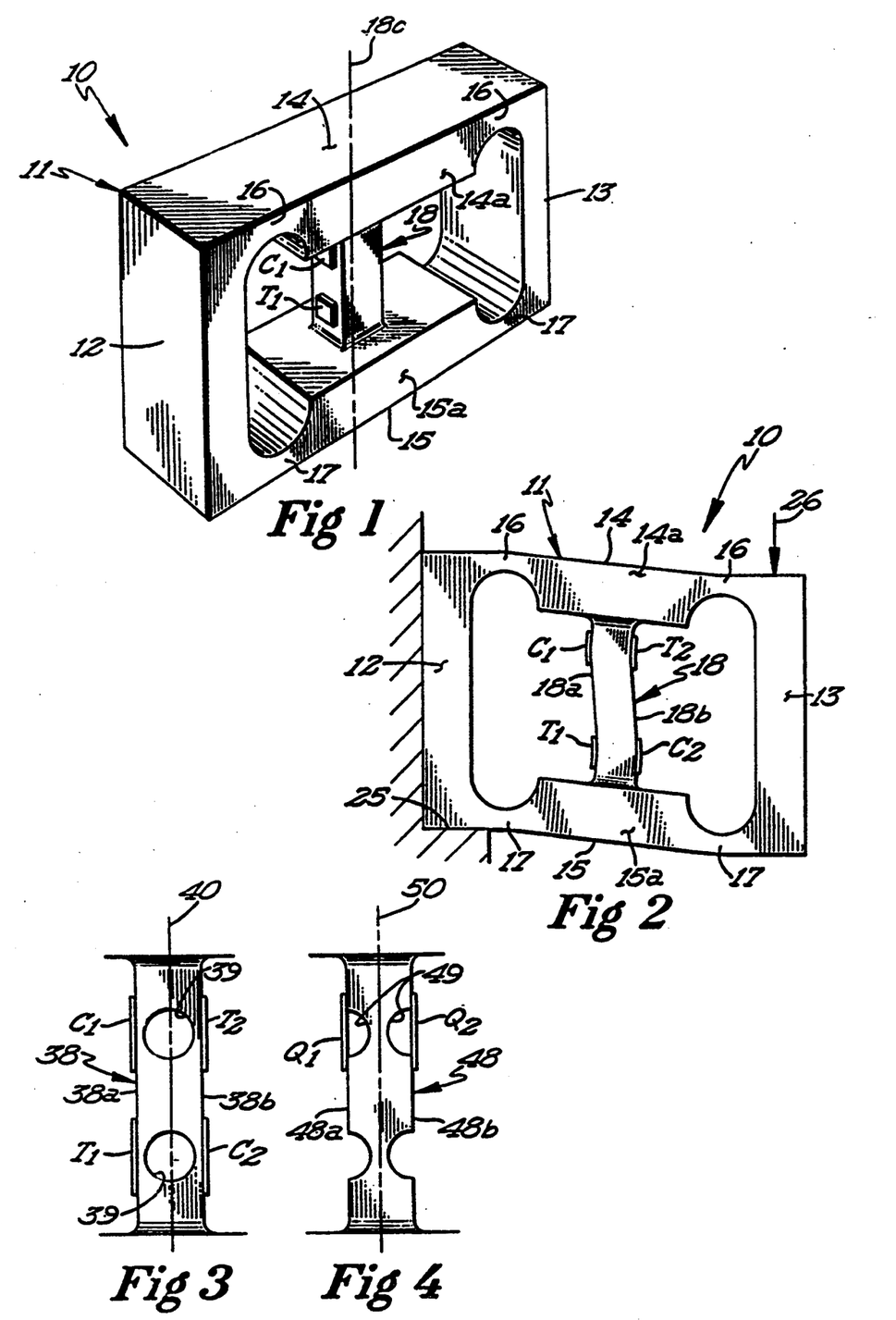
FIG. 1 is a perspective view of one embodiment of the novel load cell device.
FIG. 2 is a side elevational view of the load cell device illustrated in an exaggerated load condition to depict the dynamics of loading.
FIG. 3 is a fragmentary elevational view illustrating a modification of the bending beam of FIGS. 1 and 2.
FIG. 4 is a fragmentary elevational view of a further modification of the bending beam of the load cell device of FIGS. 1 and 2.

Referring now to the drawings and, more specifically, to FIGS. 1 and 2, it will be seen that one embodiment of the novel electronic force sensing load cell device, designated generally by the reference numeral 10, is thereshown. The electronic load cell device 10 includes a load cell structure 11, preferably machine from a suitable metal, such as aluminum or the like. The load cell structure 11 is of rectangular configuration and includes a vertical element 12, a vertical element 13, an upper horizontal element 14, and a lower horizontal element 15. The vertical elements 12 and 13 are disposed in opposed parallel relationship to each other, while the upper and lower horizontal elements are also disposed in parallel relation with respect to each other.

The junctures between the upper horizontal element and the vertical elements 12, 13 are relieved to define flexures 16 at these junctures. Similarly, the junctures between the lower horizontal element 15 and the vertical elements 12, 13 are also relieved to define flexures 17 at these junctures.

The load cell structure 11 also includes a vertical bending beam 18, which extends between, is integral with, and is perpendicular to the upper and lower horizontal elements at the transverse mid-portions thereof. The beam 18 is rectangular in cross-sectional configuration and is spaced inwardly and equidistant from the longitudinal side edges 14a of the upper horizontal element, and is spaced inwardly an equidistance from the side edges 15a of the lower horizontal element. The neutral axis 18C of the bending beam 18 is located at the intersection of the transverse and longitudinal center line planes of the load cell structure 11. The bending beam 18 has a strain gage C1 and T1 secured to one vertical surface 18a thereof and has a strain gage T2 and C2 secured to the opposed vertical surface 18b thereof. The strain gages are symmetrically placed along the neutral axis of the bending beam. The strain gages are of the resistance type and, when excited, produce signals in response to related variations in electrical impedances.

Figure 12:
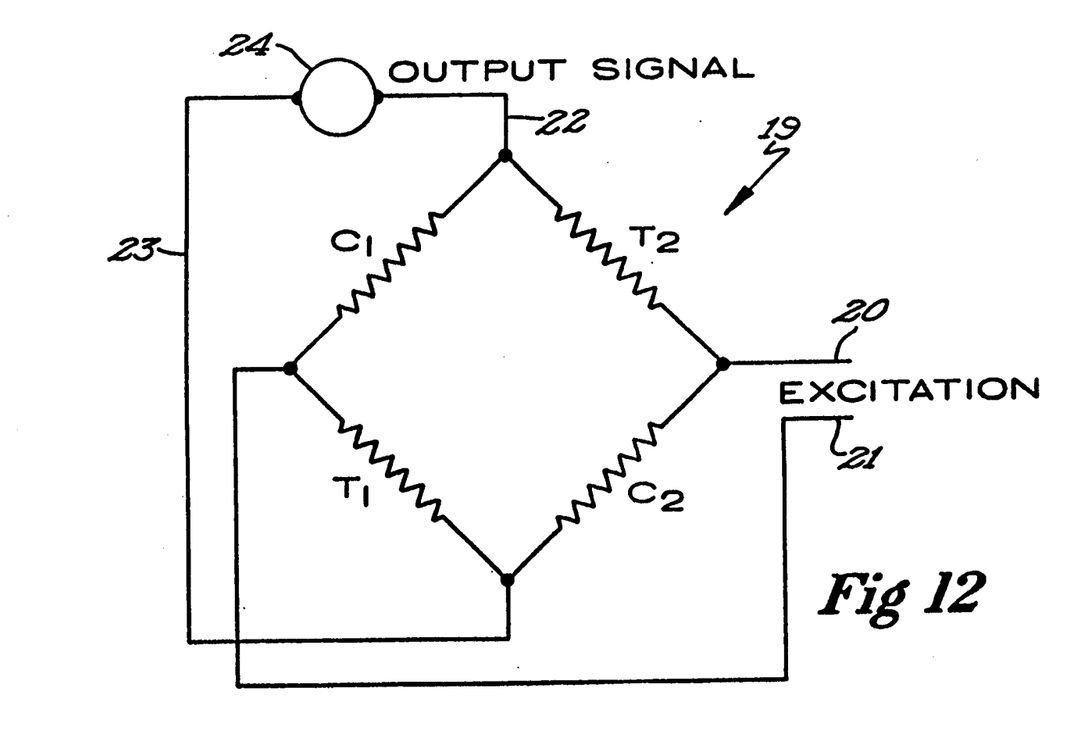
FIG. 12 is a diagrammatic schematic of the Wheatstone bridge circuit used with certain of the embodiments of the load cell device.

Referring now to FIG. 12, it will be seen that the strain gages are connected in the bridge arms of a Wheatstone bridge circuit 19. Conductors 20 and 21 connect the bridge circuit 19 to a source of electrical current, and electrical conductors 22 and 23 connect the bridge circuit to a suitable visual readout mechanism, preferably a digital readout dial 24.

In use, the load cell structure is rigidly connected to a support 25 to project therefrom in cantilevered fashion. In the embodiment shown, the vertical element 12 is secured to the support 25, and the load to be measured is designated by a load arrow 26. The applied load or force is perpendicular to the upper surface of the load cell structure. When a load is applied to the upper surface of the vertical element 13, the flexures 16 and 17 connecting the vertical and horizontal elements of the load cell structure elastically deform, as shown in FIG. 2, in the manner of a parallelogram. The deformation of the flexures connecting the horizontal and vertical elements of the load cell occurs as substantial shear. This deformation is transferred to the bending beam 18, which bends or deforms in response to the load. Strains developed in the bending beam cause the strain gages to be strained. When the bridge circuit 19 is excited or energized, the exhibited strain in the bending beam and strain gages can be measured as related variations in electrical impedance and converted into a readout signal, such as weight or the like.

Referring again to FIG. 2, it will be seen that, when the load 26 is applied to the upper horizontal element 14, the load cell will deflect or deform as a parallelogram because of the construction of the load cell structure. Since the load cell structure is of one-piece construction, the load applied to the load cell structure will always be characterized as being applied substantially perpendicularly and vertically to one of the horizontal elements or to the upper (or lower) surface of the load cell structure. This parallelogram-like elastic deformation of the load cell occurs, regardless of the specific location of the vertically applied load 26 on a surface attached to vertical element 13. The deformation as a parallelogram will occur, when the load is applied perpendicularly to the load cell structure, even though the load is not centered with respect to the vertical longitudinal center line plane of the load cell structure. Perpendicular off-center side loading of the load cell structure will not affect the parallelogram deformation of the load cell structure. Therefore, the load or force transferred to the bending beam 18 is substantially shear, which is ultimately translated to the measured quantity, such as weight or the like. Thus, the isolation of the bending beam 18 substantially eliminates the measurement of side forces or undesirable forces due to the unsymmetrical application of the load.

The unique construction of the load cell structure 11 completely eliminates the need for any auxiliary diaphragms or flexure rods normally used in eliminating undesirable lateral deflections and the like. Therefore, the unique construction of the load cell structure 11 permits the structure to retain its critical spring characteristics, which are essential in accurate load measurement. Finally, since the load cell structure has been constructed and designed to measure shear stresses, the occurrence of anelastic creep and static strain hysteresis is minimized, if not eliminated.

Referring now to FIG. 3, it will be seen that a modification of the embodiment illustrated in FIGS. 1 and 2 is thereshown. In FIG. 3, only the modified form of the bending beam, designated generally by the reference numeral 38, is thereshown. It is pointed out that the load cell which incorporates the bending beam 38 is identical to that illustrated in FIGS. 1 and 2. The bending beam 38 has strain gages C1 and T1 affixed to the vertical surface 38a thereof and has the strain gages T2 and C2 affixed to the surface 38b thereof. The bending beam 38 has a pair of vertically spaced apart openings 39 therethrough, which are located along the neutral axis 40 of the bending beam. In the embodiment shown, the openings 38 are cylindrical, and the neutral axis 40 passes diametrically through these openings. It is also pointed out that the strain gages are connected in a bridge circuit identical to the bridge circuit 19. The arrangement of FIG. 3 is employed in a load cell, as required by certain capacity ranges. In this regard, there is an increase in the shear-induced bending of the bending beam 38 as a result of the removal of material at the openings 39 along the neutral axis. The bending beam is, therefore, responsive within the particular selected load capacity ranges. Otherwise, the load cell depicted in FIG. 3 operates in the same manner as the load cell of FIGS. 1 and 2.

Referring now to FIG. 4, a further embodiment of the bending beam, designated generally by the reference numeral 48, is thereshown. The load cell with which the bending beam 48 is incorporated is identical to the embodiment of the load cell structure of FIGS. 1 and 2. The bending beam 48 has upper and lower semicylindrical recesses 49 in surfaces 48a and 48b thereof.

It will be noted that the upper pair of recesses 49 are disposed in opposed relation with respect to each other, while the lower pair of recesses are also disposed in opposed relation with respect to each other. The recesses 49 are symmetrically related with respect to the neutral axis 50 of the bending beam 48. A force sensing crystal resonator element Q1 is secured to surface 48a of the bending beam 48 and extends across one of the upper recesses 49 thereof. A second force sensing crystal resonator element Q2 is secured to the surface 48b of the bending beam 48 across the other upper recess 49 thereof. The resonator elements Q1, Q2 are disposed along the neutral axis 50 and in opposed relation to each other.

Figure 13:
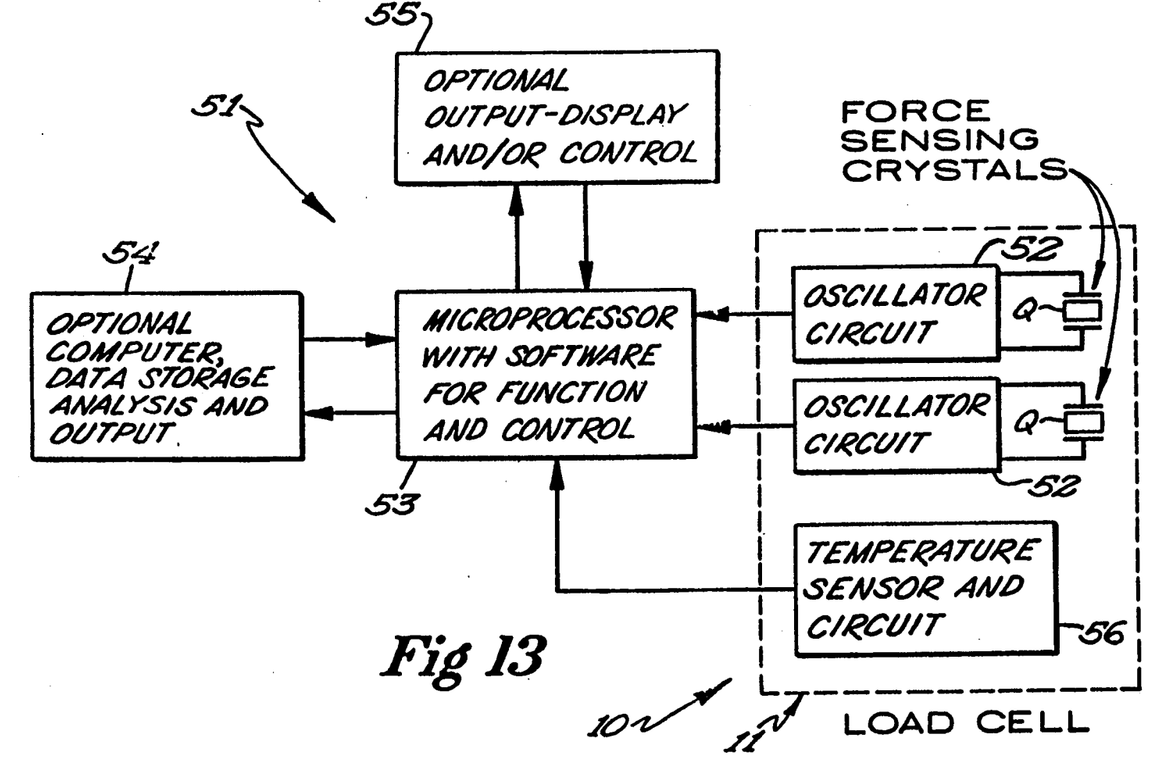
FIG. 13 is a diagram of the circuitry employed when the load cell device is used for sensitive resonators.

The circuitry diagram for the force sensor resonators is schematically illustrated in FIG. 13. In the resonator circuit, designated generally by the reference number 51, the resonator elements Q1 and Q2 are each electrically connected to one of a pair of oscillator circuits 52. The oscillator circuits excite the resonator elements when the circuitry 51 is energized. The frequency output signals from the resonator crystal elements Q1 and Q2 are directed to a microprocessor 53, having suitable software for function and control.

The microprocessor is either connected to a computer 54 for data storage, analysis and output, or the microprocessor 54 is connected to an output display and/or control 55. The resonator circuit 51 also includes a temperature sensor and circuit 56, which is electrically connected to the microprocessor 53. Even though the resonator elements Q1 and Q2 and the load cell structure have matching thermal expansion coefficients, the temperatures of the load cell must be measured and corrections made for thermal stress, which would be added to the applied load stress. The computation is accomplished in the microprocessor 53.

Figures 5, 5A:
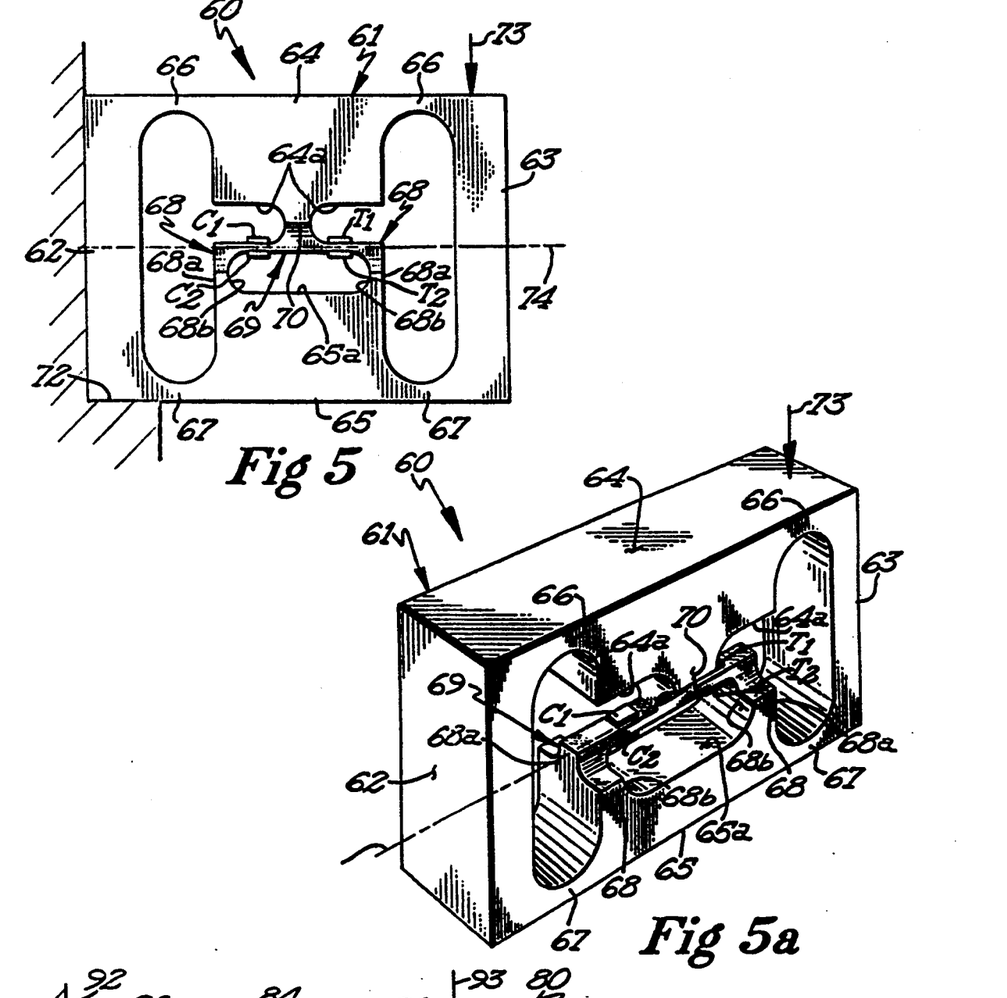
FIG. 5 is an elevational view illustrating a different embodiment of the load cell device.
FIG. 5a is a perspective view of the load cell device of FIG. 5.

Referring now to the drawings, and, more specifically, to FIGS. 5 and 5a, it will be seen that a different embodiment of the load cell device, designated generally by the reference numeral 60, is thereshown. The load cell 60 includes a load cell structure 61, which is of generally rectangular-shaped configuration, and which is preferably milled from a metal blank formed of aluminum or the like. The load cell structure 61 includes a vertical element 62, a vertical element 63, an upper horizontal element 64, and a lower horizontal element 65. Upper flexures 66 connect the upper horizontal element with the vertical elements. Lower flexures 67 connect the lower horizontal element with the vertical elements.

The lower horizontal element 65 has a pair of longitudinally spaced apart vertical load transfer elements 68 integrally formed therewith and projecting upwardly therefrom. Each load transfer element 68 has a substantially vertical surface 68a, which merges downwardly with one of the lower flexures 67. Each load transfer element 68 also has a vertical surface 68b that merges downwardly with the upper surface 65a of the lower horizontal element 65. A horizontal bending beam 69 is integrally formed with and extends between the load transfer elements 68. It will be seen that the horizontal beam 69 is of generally rectangular cross-sectional configuration and has flat upper and lower surfaces.

The upper horizontal element 64 has a load transfer element 70 integral with the central portion thereof and depending therefrom, and being rigidly interconnected to the mid-portion of the horizontal bending beam 69. It will be seen that the load transfer element 70 extends from the lower surface 64a of the upper horizontal element 64. It will also be seen that the side surfaces 70a of the upper horizontal element taper inwardly to merge with the horizontal bending beam 69, the latter having a width substantially less than the width dimension of the upper and lower horizontal elements of the load cell structure. The upper surface of the horizontal bending beam 69 has strain gages C1 and T1 affixed thereto, and the lower surface of the bending beam has strain gages C2 and T2 affixed thereto. It will be noted that one pair of strain gages is located on one side of the load transfer element 70 and the other pair of gages is located on the other side of load transfer element 70 and are symmetrically positioned with respect to the neutral axis 74 of the bending beam.

One end of the load cell structure 61 is rigidly affixed to a support 72 and projects outwardly therefrom in cantilevered fashion. The load to be measured is applied in the manner of arrow 73, perpendicular to the upper surface of the load cell structure. The strain gages C1, C2, T1, and T2 will be interconnected in a bridge circuit identical to that illustrated in FIG. 11. It will be seen that, when the load cell 60 is subjected to a load perpendicular to the upper surface of the load cell structure 61, the load cell structure will deform in the manner of a parallelogram, and this deformation will be transferred to the bending beam 69. The strain in the bending beam will be sensed by the strain gages and, when the bridge circuit is energized, the output signal may be converted into a readout, such as weight or the like. Again, it will be noted that, although the bending beam is placed in tension or compression, depending on the application of the load, this tension or compression is shear-induced so that the load actually being measured is substantial shear.

Figure 6:
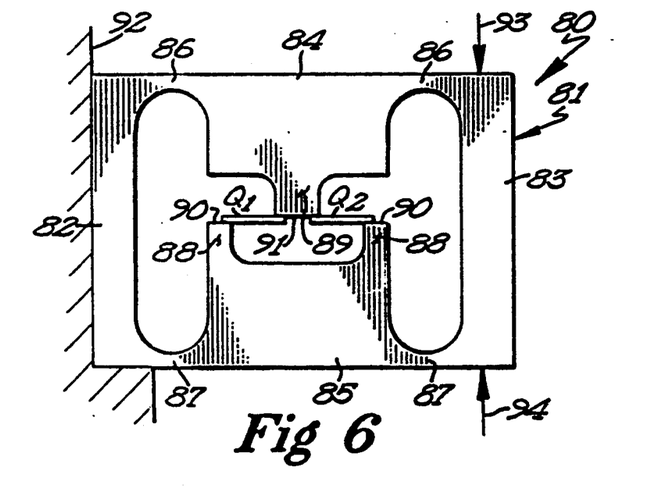
FIG. 6 is an elevational view illustrating a further modification of the load cell device illustrate in FIG. 5.

Referring now to FIG. 6, it will be seen that a further embodiment of the load cell, designated generally by the reference numeral 80, is thereshown. The load cell 80 includes the load cell structure 81 of generally rectangular configuration and being milled from a suitable rigid metallic material, such as aluminum or the like. The load cell structure 81 includes a vertical element 82, a vertical element 83, an upper horizontal element 84, and a lower horizontal element 85. The upper horizontal element 84 is interconnected to the vertical elements by upper flexures 86, and the lower horizontal element 85 is connected to the vertical elements by the lower flexures 87.

The lower horizontal element 85 has a pair of longitudinally spaced apart similar lower load transfer elements 88 integrally formed therewith and projecting upwardly therefrom. The upper horizontal element 84 has an upper load transfer element 89 integrally formed therewith and projecting downwardly therefrom. These transfer elements are disposed in substantially parallel relation with respect to each other and also in parallel relation to the vertical elements. It will be noted that the upper load transfer element 89 is positioned between and spaced equidistant from the lower load transfer elements 88. The lower load transfer elements 88 each have a substantially flat horizontal surface 90, while the upper load transfer element 89 has a downwardly facing flat surface 91. The surfaces 90 of the lower load transfer elements are disposed in coplanar relation, but are spaced slightly below the flat surface 91 of the upper load transfer element 89.

It will be seen that a pair of frequency resonator crystal elements Q1 and Q2 are each secured to the upper surface of one of the lower load transfer elements 88. Each resonator extends from the associated lower load transfer element and is secured to the lower surface of the upper load transfer element 89. The load transfer elements 88, 89 and the frequency elements Q1 and Q2 function as a bending beam. Although the load transfer elements do not bend, they do transfer the shear load to the frequency resonator elements which deform in response to the load. The frequency resonators Q1, Q2 are components of resonator frequency circuitry identical to the circuitry of FIG. 13. One end of the load cell structure 81 is rigidly affixed to a support 92 and projects therefrom. The load will be applied perpendicular to the upper surface of the load cell structure, as illustrated by the arrow 93. Conversely, a load may be applied perpendicular to the lower surface of the load cell structure 81 in the manner of the arrow 94.

When the load is applied perpendicularly to the load cell structure 81, as shown by the arrow 93, the load cell structure will elastically deform in the manner of a parallelogram and the frequency resonators Q1, Q2 will be placed in compression and tension, respectively. Tension of the frequency resonators Q1, Q2 affects their frequency output. Conversely, when a load is applied in the direction of the arrow 94, perpendicular to the lower surface of the load cell structure, the frequency resonators will be placed in states opposite the state of load 93. The tension or compression of these frequency resonators is shear-induced so that the output signal which measures the load will measure substantial shear.

Figure 7:
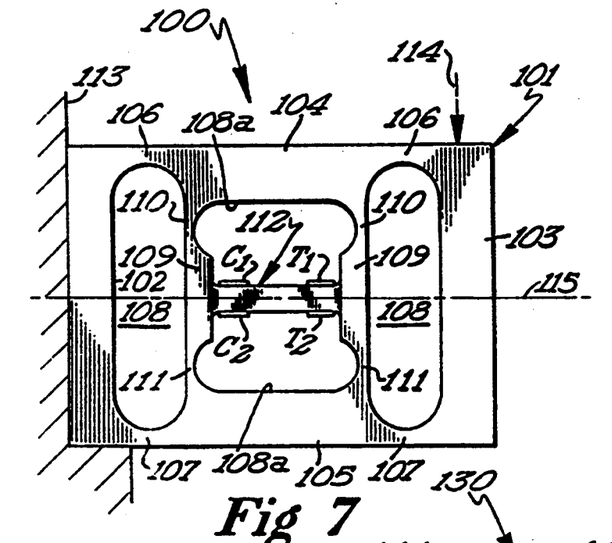
FIG. 7 is an elevational view of another embodiment of the load cell device.

Referring now to FIG. 7, it will be seen that another embodiment of the novel load cell device, designated generally by the reference numeral 100, is thereshown. The load cell device 100 includes a generally rectangular-shaped load cell structure 101 milled from a blank of metallic material, such as aluminum or the like. The load cell structure 101 includes a vertical element 102, a vertical element 103, an upper horizontal element 104, and a lower horizontal element 105. The upper horizontal element 104 is connected to the vertical elements by upper flexures 106, and the lower horizontal element 105 is connected to the vertical elements by lower flexures 107.

The load cell structure 101 is also provided with a pair of vertically extending longitudinally spaced apart elongate openings 108 therein, each being located adjacent one of the vertical elements, and each opening 108 cooperating with the horizontal and vertical elements to define the upper and lower flexures. The load cell device 101 also includes a pair of vertically spaced apart openings 108a therein.

The load cell structure 101 also includes a pair of vertical load transfer elements 109, each being spaced inwardly of one of the vertical elements 102, 103. The load transfer elements 109 are each connected to the upper horizontal element 104 by upper flexures 110 and are connected to the lower horizontal element 105 by lower flexures 111. The flexures 110, 111 have a reduced thickness dimension in the manner of the flexures 106, 107. It will be seen that these flexures 106, 107 are defined by the configuration of the openings 108 and 108a.

The vertical load transfer elements 109 are interconnected together by a horizontally disposed bending beam 112, which is disposed substantially parallel to the upper horizontal element 104 and the lower horizontal element 105. The bending beam 112 is also disposed substantially perpendicular to the load transfer elements 109.

The load cell structure 101 is mounted in cantilever fashion on a support 113 and projects outwardly therefrom. The load to be applied to the load cell is indicated by the arrow 114, which illustrates the load as being applied perpendicularly to the upper surface of the load cell. Strain gages C1 and T1 are applied to the upper surface of the bending beam 112, and strain gages C2 and T2 are applied to the lower surfaces thereof. It will be noted that the strain gages are disposed symmetrically about the neutral axis 115 of the bending beam. The strain gages are disposed in the bridge circuit 19 in the manner of the embodiments of FIGS. 1 and 2. It will be seen that a load is applied perpendicularly to the load cell structure 101 and, when the bridge circuit is energized or excited, the load cell structure will deform in the manner of a parallelogram. This distortion will be transferred to the bending beams via the load transfer elements 109. In this regard, the load transfer elements 109 will flex at the flexure zones 110, 111 and distort in the manner of a parallelogram. The bending beam 112 will, therefore, be caused to bend by substantial shear and the strain sensors C1, C2, T1, and T2 will sense the strain in the bending beam. It will, therefore, be seen that the load applied to the load cell structure will measure substantial shear and may be converted into a weight readout.

Figure 8:
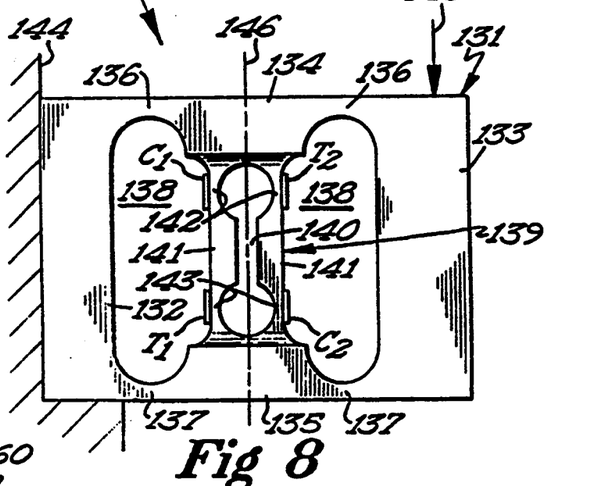
FIG. 8 is another embodiment of the load cell device.

Referring now to FIG. 8, it will be seen that a different embodiment of the load cell device, designated generally by the reference numeral 130, is thereshown. The load cell device 130 includes a generally rectangular-shaped load cell structure 131, including a vertical element 132, a vertical element 133, an upper horizontal element 134, and a lower horizontal element 135. Upper flexures 136 interconnect the upper horizontal element 134 to the vertical elements, and lower flexures 137 interconnect the lower horizontal element 135 to the vertical elements. The load cell structure 131 is milled from a suitable metal, such as aluminum or the like.

The load cell structure 131 has a pair of similar openings 138 therethrough which define the vertically disposed bending beam 139, which extends between and is integral with the upper and lower horizontal elements. The bending beam 139 is disposed in substantially parallel relation with the vertical elements and is disposed substantially perpendicular to the horizontal elements. In the embodiment shown, the bending beam 139 has a symmetrically shaped vertical opening 140 therein and the opening 140 is of generally dumbbell configuration to define a pair of substantially parallel opposed beam elements 141. The opening 140 also defines a pair of upper flexures 142, each interconnecting one of the beam elements with the upper horizontal element 134. The opening 140 also defines a pair of lower flexures 143, which extend between and interconnect each beam element to the lower horizontal element 135.

The load cell structure 131 is mounted on a support 144 and projects therefrom as a cantilever. The load to be applied to the load cell structure is designated by the arrow 145, which illustrates the load as being applied perpendicular to the upper surface of the load cell. Strain gages C1, T1, C2, and T2 are secured to the beam elements 141 and are disposed symmetrical with respect to the neutral axis 146 of the bending beam.

When a load is applied, as indicated by the arrow 145, to the load cell, the load cell will distort in the manner of a parallelogram because of its specific construction.

The applied load will be substantially shear and will be transferred to the bending beam 139, which bends in response to the shear-induced load. The strain gages will measure strain in the bending beam, and these may be read out as a weight measurement. It is pointed out that the strain gages will be connected in a bridge circuit identically to the circuitry 51 of FIG. 12.

In the embodiment of FIG. 8, the bending beam is more sensitive to shear-induced bending because of the specific construction of the bending beam and allows the load cell to measure in a different capacity range. It is also pointed out that the load cell device illustrated in FIG. 8 will measure substantial shear, even though the load is not applied symmetrically to the upper surface of the load cell, as required by prior art devices.

Figure 9:
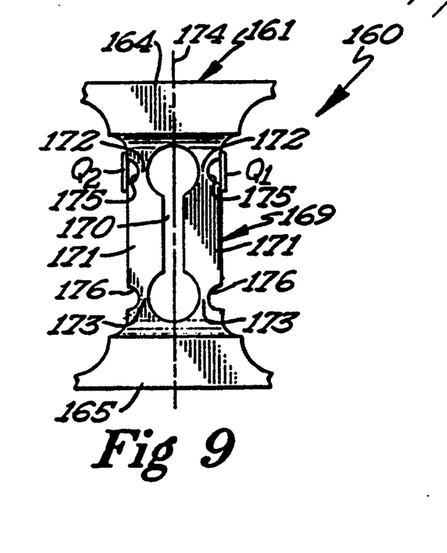
FIG. 9 is a fragmentary elevational view illustrating another embodiment of the bending beam of FIG. 8.

Referring now to FIG. 9, it will be seen that a slightly different embodiment of the load cell bending beam illustrated in FIG. 8 is thereshown. Since the load cell device illustrated in FIG. 9 differs from the embodiment illustrated in FIG. 8 only in the construction of the bending beam, FIG. 9 illustrates, for the most part, a modified version of the bending beam illustrated in FIG. 8. The load cell device 160 illustrated in FIG. 9 includes a load cell structure 161 having vertical elements (now shown) and an upper horizontal element 164 and a lower horizontal element 165. A bending beam 169 extends between and is integral with the upper and lower horizontal elements in the manner of the embodiment of FIG. 8.

The bending beam 169 also includes the dumbbell-shaped vertical opening 170 therein to thereby define a pair of opposed substantial parallel beam elements 171. Upper flexures 172 interconnect the beam elements with the upper horizontal element and lower flexures 173 interconnect the beam elements 171 with the lower horizontal element. The beam elements 171 also each have upper recesses 175 therein which are disposed in opposed relation with respect to each other. Each beam element also has lower recesses 176 therein which are disposed in opposed relation with respect to each other.

One of the upper recesses 175 has a frequency resonator Q2 applied thereacross, while the other upper recess has a frequency resonator Q1 applied thereover. The frequency resonators Q1, Q2 are components of resonator frequency circuitry identical to the circuitry of FIG. 13, and are symmetrically located with respect to the neutral axis 174. However, the recesses 175, 176 impart bending sensitivity to the bending beam 169 to thereby permit measurement of a different range of shear-induced bending of the load cell device.

Figure 10:
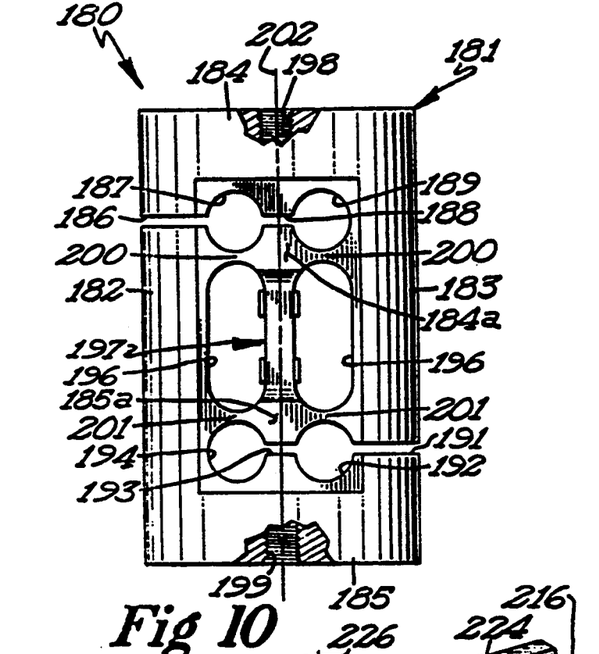
FIG. 10 is still a further embodiment of the novel load cell device.

Referring now to FIG. 10, it will be seen that a further embodiment of the novel load cell device, designated generally by the reference numeral 180, is thereshown. The load cell device 180 includes a generally cylindrical load cell structure 181, which includes a vertical element 182, a vertical element 183, an exterior upper horizontal element 184, and an exterior lower horizontal element 185.

In the embodiment shown, the load cell structure 181 has an upper slot-like opening 186 therein, which communicates with an enlarged cylindrical opening 187. A slot 188 intercommunicates the large cylindrical opening 187 with an enlarged cylindrical opening 189. The configuration of the upper slot and enlarged openings defines the upper horizontal element 184.

The load cell structure 181 also has a slot-like opening 191 in the lower portion thereof, which communicates with a cylindrical opening 192 therein. A slot 193 intercommunicates the cylindrical opening 192 with an enlarged cylindrical opening 194. The configuration of the lower slot and cylindrical openings defines the lower horizontal member 185.

It will also be noted that the load cell structure 181 has a pair of similar elongate openings 196 through the mid-portion thereof which cooperate with each other to define a centrally located vertically disposed bending beam 197. The openings 196 cooperate with the upper slots and enlarged openings to define an interior upper horizontal element 184a. Similarly, the openings 196 cooperate with the lower slots and enlarged openings to define an interior lower horizontal element 185a. The load cell 181 has a centrally located axially disposed upwardly opening recess 198 in the upper horizontal member thereof. The load cell structure also has a downwardly opening axially disposed recess 199 therein. These openings are threaded to permit end line attachment of the load cell to a support and to a load bearing element (now shown).

It will be seen that the openings 196 cooperate with the upper enlarged cylindrical openings 187, 189 to define upper flexures 200 which interconnect the interior upper horizontal element 184a with the vertical elements of the load cell. Similarly, the openings 196 cooperate with the lower enlarged cylindrical openings 192, 194 to define flexures 201, which are disposed between the interior lower horizontal element 185a and the vertical elements of the load cell. The bending beam 197 has a neutral axis 202, and the strain gages C1, C2, T1, and T2 are applied to vertical surfaces of the bending beam symmetrically about the neutral axis 202. It is pointed out that the strain gages are connected in a bridge circuit, as shown in the circuitry 51 of FIG. 12.

If the load cell structure 201 is secured to a support by means of a bolt or other securing means secured in the recess 198, then a load applied to a load bearing element secured in the recess 199 will be vertically and substantially perpendicular with respect to the lower exterior horizontal element 185. The load cell structure will deform as a parallelogram, and this load will be transmitted to the bending beam 197, which will bend in response to this load. In this regard, the elastic parallelogram deformation involves the vertical elements 182, 183 and the interior upper and lower horizontal elements 184a and 185a. Since the load cell structure will deform as a parallelogram, the load exerted on the load cell will be substantially shear, which induces bending of the bending beam 197. The strain gages will measure the shear-induced strain of the bending beam, and this load may be measured as weight. Again, it will be noted that this arrangement discloses an end line loading of the load cell structure.

Figure 11:
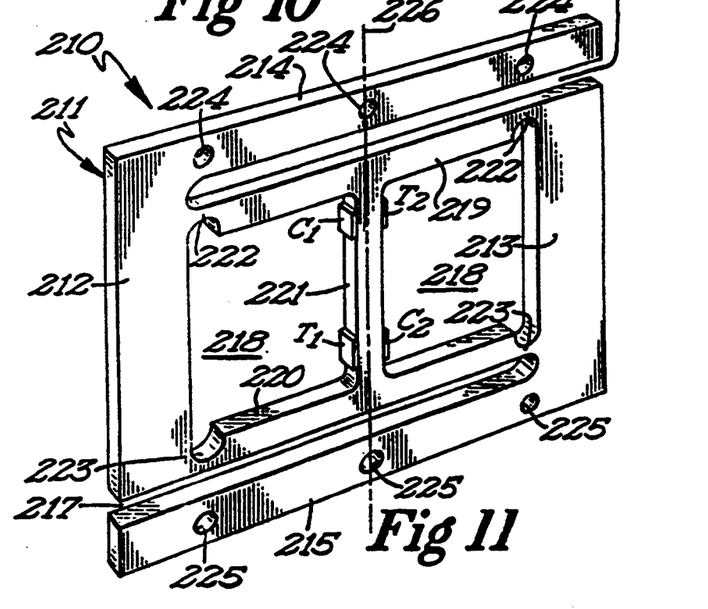
FIG. 11 is a further embodiment of the load cell device.

Referring now to FIG. 11, it will be seen that another embodiment of the load cell device, designated generally by the reference numeral 210, is thereshown. The load cell device includes a generally rectangular-shaped load cell structure 211, which includes a vertical element 212, a vertical element 213, an exterior upper horizontal element 214, and an exterior lower horizontal element 215. The load cell structure 211 has an elongate upper slot 216 therein, which is horizontally disposed and opens outwardly along one vertical edge of the load cell structure. The load cell structure 211 also has a lower elongate slot 217 therein, which is disposed substantially parallel to the upper slot 216, and which opens outwardly at the other vertical edge thereof.

The load cell structure 211 has a pair of generally rectangular-shaped openings 218 therein adjacent the central portion thereof. The openings 218 cooperate with the upper slot 216 and the lower slot 217 to define an interior upper horizontal element 219 and an interior lower horizontal element 220. It will be noted that these horizontal elements 219, 220 are disposed in substantially parallel relation with respect to each other and are disposed substantially parallel to the exterior upper and lower horizontal elements. The openings 218 also define a centrally located vertical bending beam 221, which extends between the interior upper horizontal element 219 and the interior lower horizontal element 220.

It will be noted that the configurations of the openings 218 cooperate with the upper slot 216 to define upper flexures 222 between the interior upper horizontal element 219 and the vertical elements of the load cell structure 211. It will also be noted that the interior lower horizontal element 220 is connected to the vertical elements of the load cell structure 211 by lower flexures 223.

The load cell structure 211 may be machined or stamped from sheet stock of a suitable metal, such as aluminum or the like. It will be seen that the exterior upper horizontal element 214 has a plurality of openings 224 therein to permit the load cell structure to be attached or connected to a suitable support structure by screws, bolts, or the like. It will also be noted that the exterior lower horizontal element 215 has a plurality of longitudinally spaced apart openings 225 therein to permit connection of the lower horizontal element by means of screws, bolts, or the like to a load.

The bending beam 221 has strain gages C1, C2, T1, and T2 applied to opposite vertical surfaces thereof, and these strain gages are located symmetrically about the neutral axis 226 of the bending beam. It is pointed out that the strain gages C1, C2, T1, and T2 are connected in a Wheatstone bridge circuit identical to the bridge circuitry 19 of FIG. 12. Therefore, when the circuit is energized and a load is applied to the load cell structure, the latter will deform in response to the load to permit the load to be measured by the Wheatstone bridge circuit.

In the embodiment shown, the load will be applied perpendicularly to the exterior lower horizontal member, and this load will cause the parallelogram defined by the vertical elements and the interior horizontal elements to elastically deform in the manner of the embodiment of FIGS. 1 and 2. Since the load is applied perpendicularly to the load cell structure, the deformation of the load cell structure, and especially the parallelogram thereof, will deform in response to substantial shear. The bending beam 221 will, therefore, elastically deform (bend) to permit the exhibited strains in the bending beam to be measured by the strain gages. Thus, the load cell device 210 also measures the shear-induced bending strain.

Figure 14:
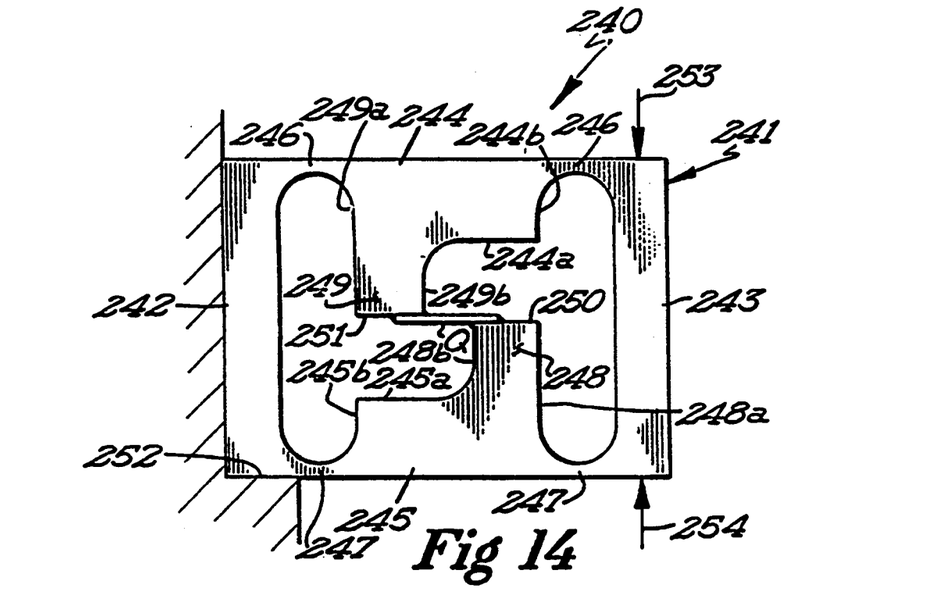
FIG. 14 is an elevational view illustrating a different embodiment of the load cell device.

Referring now to FIG. 14, it will be seen that a different embodiment of the load cell device, designated generally by the reference numeral 240, is thereshown. The load cell device 240 includes a load cell structure 241, which is of generally rectangular configuration, and which is preferably machined from a block of metal, such as aluminum, stainless steel, or the like. The load cell structure 241 includes a vertical element 242, a vertical element 243, an upper horizontal element 244, and a lower horizontal element 245 rigidly interconnected together. The load cell device includes a pair of upper flexures 246 between the upper horizontal element 244 and the vertical elements 242, 243. The load cell structure 241 includes a pair of lower flexures 247 between the lower horizontal element 245 and the vertical elements 242, 243.

The load cell structure 241 also includes a vertically disposed lower load transfer element 248 and a vertically disposed upper load transfer element 249. It will be noted that these load transfer elements are longitudinally offset with respect to each other and are disposed in substantially parallel relation to the end elements 242, 243 and extend substantially normal or perpendicular to the upper and lower horizontal elements. The lower load transfer element 248 has a substantially flat horizontal upper surface 250, while the upper load transfer element 249 has a substantially flat horizontal lower surface 251. The surfaces 250, 251 are vertically spaced apart from each other and are disposed in substantially parallel relation with respect to each other and with the upper surface of the upper horizontal element 244 and the lower surface of the lower horizontal element 245.

It will be seen that the lower load transfer element 248 has a relatively long vertical surface 248a, which extends down to one of the flexures 247, and also has shorter vertical surface 248b, which extends upwardly from the upper surface 245a of the lower horizontal element 245. Similarly, the upper load transfer element 249 has a longer vertical surface 249a, which extends upwardly and merges into one of the upper flexures 246. The upper load transfer element 249 also has a shorter vertical surface 249b, which extends downwardly from the lower surface 244a of the upper horizontal element 244.

It will also be noted that the upper horizontal member 244 has a vertical surface 244b which merges into an upper flexure 246. Similarly, the lower horizontal element 245 has a vertical surface 245b which merges into a lower flexure 247.

A force sensor frequency resonator Q is secured to and extends between the upper and lower load transfer elements. In the embodiment shown, the force sensor frequency resonator crystal element Q is secured to the lower surface 251 of the upper load transfer element 249 and to the upper surface 250 of the lower load transfer element 248. The vertical element 242 is secured to a support 252 and projects therefrom in cantilevered fashion. Arrow 253 represents the perpendicular direction of a force applied to the upper surface of the load cell structure 241. Arrow 254 represents the application of a force or load applied perpendicular to the lower surface of the load cell structure 241.

The load transfer elements 248, 249 and frequency resonator crystal element Q define a bending beam. Although the load transfer elements 248, 249 do not bend, the elements support and transfer the shear load acting on the load cell to the force sensor frequency resonator crystal element Q. When the load or force is applied in the manner of arrow 253, perpendicular to the upper surface of the load cell structure, the force sensor frequency resonator will be placed in tension, which affects the frequency output of the resonator when excited by the resonator signal. Conversely, when the force is applied in the manner of the arrow 254, perpendicular to the lower surface of the load cell structure, the force sensor frequency resonator Q will be placed in compression, which also affects the frequency output of the resonator. In either event, the load cell structure will flex and distort in the manner of a parallelogram so that the load cell will measure substantial shear.

It is pointed out that the electrical circuit for the load cell 240 will be similar to the circuit 51, illustrated in FIG. 13, with the exception that only one resonator crystal element and only one oscillator will be provided. The output signal may measure the force applied to the load cell as a weight load.

Figure 15:
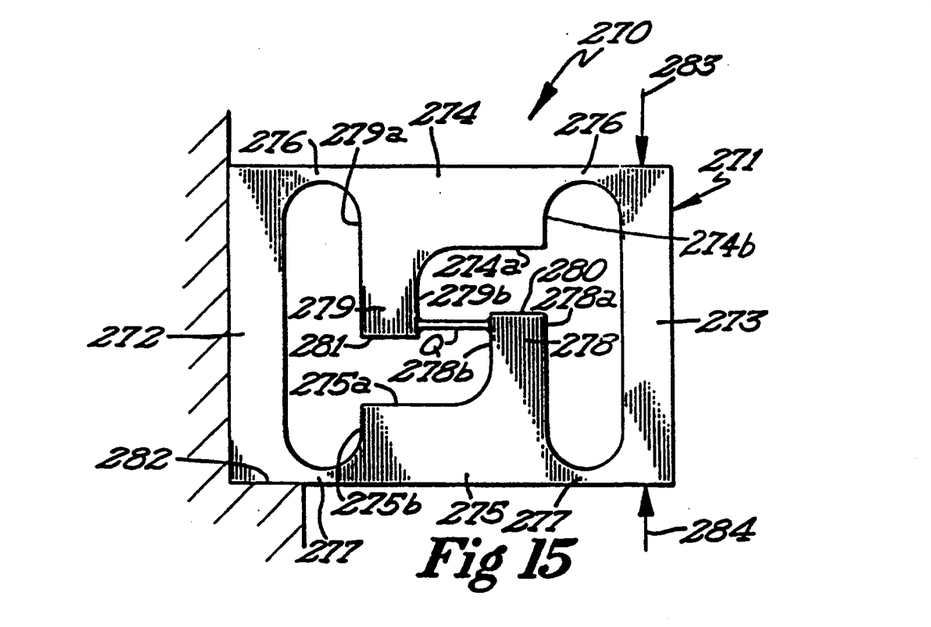
FIG. 15 is an elevational view illustrating another embodiment of the load cell device.

Referring now to FIG. 15, it will be seen that a different embodiment of the load cell device, designated generally by the reference numeral 270, is thereshown. The load cell device 270 includes a load cell structure 271 of generally rectangular configuration and machined from a suitable metal, such as aluminum or the like. The load cell structure 271 includes a vertical element 272, a vertical element 273, an upper horizontal element 274, and a lower horizontal element 275. Upper flexures 276 are located between the upper horizontal element 274 and the vertical elements 272, 273. Lower flexures 277 are located between the lower horizontal element 275 and the vertical elements 272, 273.

The load cell structure also includes a lower load transfer element 278 and an upper load transfer element 279, which are longitudinally offset from each other. The upper and lower load transfer elements are also disposed in substantially parallel relation to each other and to the vertical elements and are substantially normal or perpendicular to the horizontal elements. The lower load transfer element 278 is provided with a flat substantially horizontal upper surface 280, while the upper load transfer element 279 is provided with a substantially flat horizontal lower surface 281. The surfaces 280 and 281 are disposed in substantially parallel relation with respect to each other and with respect to the upper surface of the upper horizontal element 274 and the lower surface of the lower horizontal element 275. The lower load transfer element 278 is provided with a vertical surface 278a, which extends from the upper surface 280 thereof to the adjacent flexure 277. The lower load transfer element also includes a vertical surface 278b, which extends from the surface 280 to the upper surface 275a of the lower horizontal element 275. The lower horizontal element 275 also includes a vertical surface 275b, which merges into the adjacent flexure 277.

The upper load transfer element 279 also has a long vertical surface 279a, which extends from the horizontal surface 281 to the adjacent flexure 276. The upper load transfer element has a shorter vertical surface 279b, which extends from the horizontal surface 281 to the lower surface 274a of the upper horizontal element 274. The upper horizontal element 274 also has a vertical surface 274b, which merges into the adjacent upper flexure 276. A force sensor frequency resonator crystal element Q extends between the vertical surface 278b of the lower load transfer element and the vertical surface 279b of the upper load transfer element 279. It will again be noted that the load transfer elements 278, 279 and the resonator crystal element Q define a bending beam in the manner of the embodiment of FIG. 14. One end of the load cell structure 271 is rigidly mounted on a support 282. The force to be measured is represented by the arrow 283 or the arrow 284.

When the force is applied in the direction of the arrow 283, perpendicularly to the upper surface of the load cell structure, the load cell structure will elastically deform as a parallelogram. This deformation causes the force sensor frequency resonator Q to be placed in tension, which affects the frequency output signal of the resonator. Conversely, when the force is applied in the direction of the arrow 284, perpendicularly to the lower surface of the load cell structure, the force sensor frequency resonator Q will be placed in compression. In either event, the isolation of the vertical beam elements results in the load cell device measuring substantial shear. It is, again, pointed out that the circuitry for the force sensor frequency resonator element Q in the embodiment of FIG. 6 will be similar to the circuitry of FIG. 13, but will include only one force frequency resonator element and only one oscillator.

It will be seen that, in all of the embodiments of the load cell device, each load cell structure includes deformation means which is or functions as a bending beam. In each embodiment of the load cell device, when a load is applied thereto, the load cell structure elastically deforms as a parallelogram because of its unique construction. Since the load cell structure deforms as a parallelogram, the force sensed in this deformation is substantial shear, even though the force may not be applied in some predetermined location as required by prior art devices. This shear force is transferred to a bending beam in all of the embodiments and even though the bending beam elastically deforms by bending, it measures only substantial shear. In all of the embodiments, the bending beam is isolated from the deflecting components of the load cell structure by flexures.

It will, therefore, be seen that this novel load cell obviates the need for auxiliary diaphragms and/or flexure rods or the like. Finally, it has been found that my novel load cell device substantially reduces, if not completely eliminates, anelastic creep and static strain hysteresis, where the sensor supports the load.

Thus, it will be seen that I have provided a novel load cell device, which is not only of simple and inexpensive construction, but one which functions in a more efficient manner than any heretofore known comparable device.

What is claimed is:

1. A load cell device for measuring loads applied thereto as a weight determination, comprising:

a single-piece load cell structure including a pair of vertically spaced apart horizontal elements, a pair of longitudinally spaced apart opposed vertical elements, and flexures, integral with said horizontal and vertical elements, for connecting each horizontal element with said vertical elements, a bending beam integrally connected with said pair of horizontal elements of said load cell and being spaced from said flexures, said bending beam being symmetrically spaced from and substantially parallel to said pair of vertical elements and being disposed substantially normal to said pair of horizontal elements, said bending beam having opposed vertical surfaces, each vertical surface having a pair of vertically spaced apart recesses therein, electronic sensor means mounted on said bending beam, said sensor means including a pair of frequency resonator crystal elements, each bending beam having opposed vertical surfaces, each vertical surface having a pair of vertically spaced apart recesses therein, electronic sensor means mounted on said bending beam, said sensor means including a pair of frequency resonator crystal elements, each being positioned across one of said recesses, whereby, when a load is applied vertically and perpendicularly to the plane of one of said horizontal elements, said load cell structure will elastically deform at said flexures as a parallelogram to thereby transfer shear force to said bending beam and cause shear-induced bending of said bending beam, and
electronic circuitry including said sensor means producing an output signal caused by deformation of said bending beam and being operable to convert said output signal to a perceptive weight readout.

* * * * *